United States Patent
Dunlap et al.

(10) Patent No.: US 8,164,457 B2
(45) Date of Patent: Apr. 24, 2012

(54) APPLICATION OF RADIO FREQUENCY IDENTIFICATION

(75) Inventors: Richard L. Dunlap, Lima, OH (US); William A. Slat, Brooklyn, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 12/472,592

(22) Filed: May 27, 2009

(65) Prior Publication Data

US 2009/0237215 A1 Sep. 24, 2009

Related U.S. Application Data

(62) Division of application No. 10/847,492, filed on May 17, 2004, now abandoned.

(60) Provisional application No. 60/506,750, filed on Sep. 30, 2003.

(51) Int. Cl.
*G08B 13/14* (2006.01)
(52) U.S. Cl. ...... 340/572.1; 705/22; 235/375; 343/700 R
(58) Field of Classification Search .... 340/572.1–572.9, 340/5.9, 5.91; 705/22; 456/39; 235/375–385; 343/703, 700 R, 907; 438/106
See application file for complete search history.

(56) References Cited

U.S. PATENT DOCUMENTS

| | | | | |
|---|---|---|---|---|
| 5,963,133 A * | 10/1999 | Monjo | | 340/572.1 |
| 6,133,834 A * | 10/2000 | Eberth et al. | | 340/572.5 |
| 6,191,691 B1 | 2/2001 | Serrault | | |
| 6,302,461 B1 * | 10/2001 | Debras et al. | | 294/68.1 |
| 6,816,076 B2 * | 11/2004 | Pomes | | 340/572.1 |
| 6,982,640 B2 * | 1/2006 | Lindsay et al. | | 340/540 |
| 7,135,979 B2 * | 11/2006 | Savagian et al. | | 340/572.8 |
| 2002/0030598 A1 * | 3/2002 | Dombrowski et al. | | 340/572.1 |
| 2002/0073646 A1 * | 6/2002 | Von Gutfeld et al. | | 53/54 |
| 2002/0125997 A1 * | 9/2002 | Kashi et al. | | 340/10.52 |
| 2002/0139839 A1 * | 10/2002 | Catan | | 235/375 |
| 2003/0043039 A1 * | 3/2003 | Salemi et al. | | 340/572.8 |
| 2005/0280542 A1 * | 12/2005 | Shieh | | 340/572.8 |

FOREIGN PATENT DOCUMENTS

EP 1308884 A1 5/2003

* cited by examiner

*Primary Examiner* — George Bugg
*Assistant Examiner* — Edny Labbees
(74) *Attorney, Agent, or Firm* — Dykema Gossett PLLC

(57) ABSTRACT

A method for making a container including a radio frequency identification label is provide. In an embodiment the method includes placing a radio frequency identification (RFID) label into a mold; positioning the RFID label so that an outer portion of the label is substantially flush with the mold surface; and molding a container such that the outer portion of the RFID label is substantially flush with the outer surface of the side wall of the container. An article, which may be formed using the foregoing method, is also disclosed.

20 Claims, 3 Drawing Sheets

APPLICATION OF RADIO FREQUENCY IDENTIFICATION

CROSS-REFERENCE TO RELATED APPLICATIONS

This application is a divisional of application Ser. No. 10/847,492, filed May 17, 2004, which claims priority to U.S. Provisional Patent Application Ser. No. 60/506,750, filed Sep. 30, 2003, the entire contents of which are herein incorporated by reference.

BACKGROUND OF THE INVENTION

Currently containers, such as hollow plastic containers, and the like are provided with bar codes to track inventory and to identify inventory and to identify products at point of sale. It would be highly desirable to provide a more efficient system for this purpose as well as for other purposes wheretracking and/or identification are desirable.

Radio frequency identification (RFID) may be effectively used for this purpose. It involves the use of a small computer or memory chip that may uniquely identify an item when read by a scanner. Thus, using RFID one may simply and conveniently, for example, locate and track items in stockrooms and in stores, minimize backroom storage of merchandise, accurately identify returned merchandise, allow customers to check out by simply scanning the carts, and facilitate identification, counting and location of items in a rapid manner. Moreover, RFID can provide numerous other advantages, such as monitoring product expiration dates and identifying when products need to be removed from shelves, tracking inventory, tracking temperature history, and warning when shoplifting occurs and counterfeiting of product.

Thus, RFID technology can be expected to replace the familiar product bar codes and indeed provide numerous advantages thereover, some of which are indicated hereinabove. These are small and unobtrusive and can be easily and readily tracked and monitored to provide simple and rapid identification and data for a variety of purposes.

However, it would be highly advantageous to inexpensively and permanently apply RFID to products such that the identification does not represent an aesthetically objectionable configuration and is tamper proof. Simply adhering the RFID by adhesive means or applying same to a label would clearly not be entirely satisfactory.

It is, therefore, a principal object of the present invention to provide an improved plastic article which has radio frequency identification (RFID) simply, conveniently and expeditiously applied thereto.

It is a further object of the present invention to provide an improved article as aforesaid with permanent application of RFID thereto and with the unobtrusive location of same on the article.

It is a still further object of the present invention to provide an improved article as aforesaid that enables the effective application of RFID to a wide variety of articles, such as consumer products, pallets and other articles where RFID would be advantageous.

It is an additional object of the present invention to provide an improved plastic article including RFID integrally applied thereto.

Further objects and advantages of the present invention will appear hereinbelow.

SUMMARY OF THE INVENTION

In accordance with the present invention the foregoing objects and advantages are readily obtained.

The present invention provides for an improved article having an integral RFID or transponder as a permanent part of the article. The article is desirably a plastic article, as a hollow container or a pallet, that is injection molded and/or blow molded with a small computer or memory chip applied thereto in the injection molding or blow molding process so that the chip is integrally and conveniently applied thereto in the molding process. The chip with connections for an antenna or possibly the antenna itself and possibly also a battery could be applied in this manner. If the RFID is applied to a container, one could apply same to a desired location, as for example, on the base where it would not be readily visible, or on a side wall where it would be covered by a label and yet would not be removed when the label is removed.

The present invention also contemplates permanently applying RFID to a plastic article so that the RFID becomes an integral and permanent part of the article, as by inserting the RFID in the mold when the plastic article is injection molded and/or blow molded and molding the RFID to a desired location on the article. The RFID may if desired be applied in the molding process so that it is flush with the outside surface of the article.

Further features and advantages of the present invention will appear hereinbelow.

BRIEF DESCRIPTION OF THE DRAWINGS

The present invention will be more readily understandable from a consideration of the following illustrative drawings, wherein.

DETAILED DESCRIPTION OF PREFERRED EMBODIMENTS

In accordance with the present invention one could form the chip as part of a product, as a container, during the injection molding or blow molding operation by placing the chip in the mold and forming the article with the chip integrally connected thereto in the molding process. The chip, with also possibly the antenna and also possibly a battery, could be applied on various places on the article as desired, as on the base of a container or on a side wall where it would be covered by a label and therefore not be visible. The chip could also if desired be placed on the neck of a container. If the frequency is difficult to read through the liquid contents of a container, application on the neck can obviate this difficulty. The chip, antenna and possibly a battery would become a permanent and integral part of the article in the molding process. The chip and antenna would desirably be mounted on a substrate as a plastic film or other desirable substrate, and integrally applied in this manner, with also a battery, if desired. Alternatively, the chip alone could be applied and the antenna printed post mold. Desirably, one can use a conductive material as at least a part of the application material or substrate, such as a silver or copper base ink.

It may be helpful to apply the chip with or without antenna by means of a magnet. A magnet would be placed in the mold to assist in registering the chip and antenna with or without battery in a desired location in the mold.

As a further alternative, chips with or without antennae could be delivered into the mold with air delivery and held in a desired location by a suitably positioned magnet. A recess area in the mold may be used to accommodate the chip and antenna. One may also use vacuum to position and hold the chip in place. The resultant chip and antenna would then be flush with the final article as the article is molded. Still further, the chips could be fed into the mold using a web with the chips, with or without antenna and battery, placed in register on the web and with indexing the web to the mold.

Labels could be applied over the integral chip and antenna. Label graphics could be integrated with the chip so that they alter over time activated by the chip, as for example when a product is approaching its expiration time, or has exceeded temperature limits, or for a special sales promotion, or for a price change.

Figure 1:
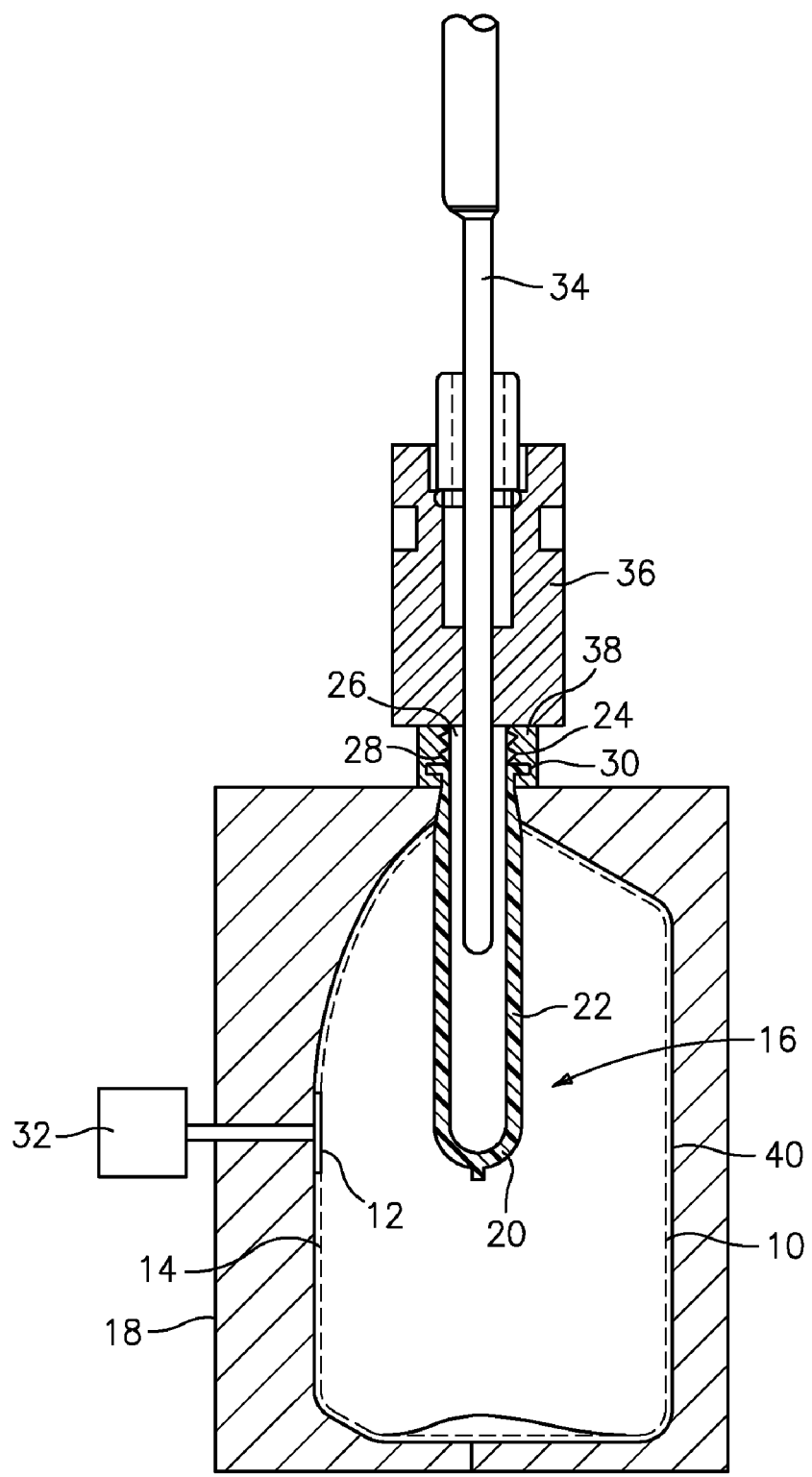
FIG. 1 is a side view showing a preform positioned in a blow mold for forming a blow molded container.

Referring to the drawings, FIG. 1 is a side view showing the preparation of blow molded container 10 (shown in phantom) having a radio frequency identification (RFID) label 12 integrally connected to the side wall 14 of the container. In accordance with the embodiment of FIG. 1, a straight, cylindrical warm plastic preform or parison 16 is positioned in blow mold 18. Parison 16 has a closed base 20, a straight body portion 22 extending upwardly therefrom, a straight neck portion 24 extending upwardly from the body portion, and an open mouth 26. If desired, the parison has a threaded neck portion 28 and an outwardly extending flange 30 which aids in seating the parison 16 in the blow mold 18. The blow mold 18 is closed on the parison firmly seating the parison in the blow mold. The RFID label 12 is held in the blow mold by holder 32 for integral connection with the side wall of the blow molded container 10 when the parison is expanded into conformity with the blow mold to form the blow molded container. Preferably, the RFID label is embedded in the container sidewall so as to be flush with the container sidewall.

Stretch rod 34 is positioned within the preform 16 and blow nozzle 36 is placed above the preform engaging open mouth 26. If desired, the blow nozzle 36 may include downwardly extending flange 38 which is moved into engagement with the outside of neck portion 24. In accordance with conventional procedure, stretch rod 34 is preferably fully extended in the clamped; warm preform to extend the preform to the base of the blow mold and to provide an extended preform. High pressure air is then introduced into the extended preform from blow nozzle 36 from a high pressure air source (not shown) to expand or stretch the extended, warm preform into conformity with the cavity 40 of blow mold 18 and with RFID label 12 integrally connected to the sidewall 14 of the blow molded container 10 as discussed above. Holder 32 releases RFID label 12 after the blow molding process. The result is a blow molded container 10, desirably biaxially oriented, with RFID label 12 firmly connected to the sidewall surface of container 10, and preferably embedded in the sidewall so as to be flush with the outside surface of the article.

Figure 2:
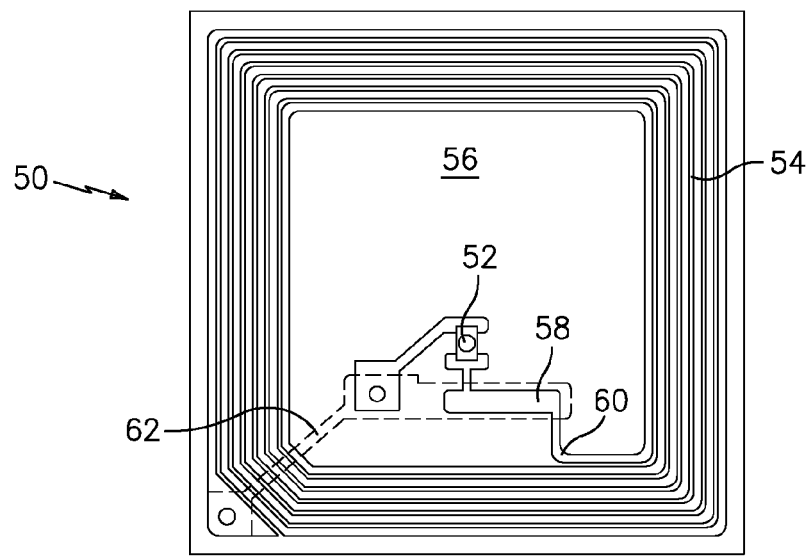
FIGS. 2-3 are identification labels including a memory chip and antenna and connections therebetween.
Figure 3:
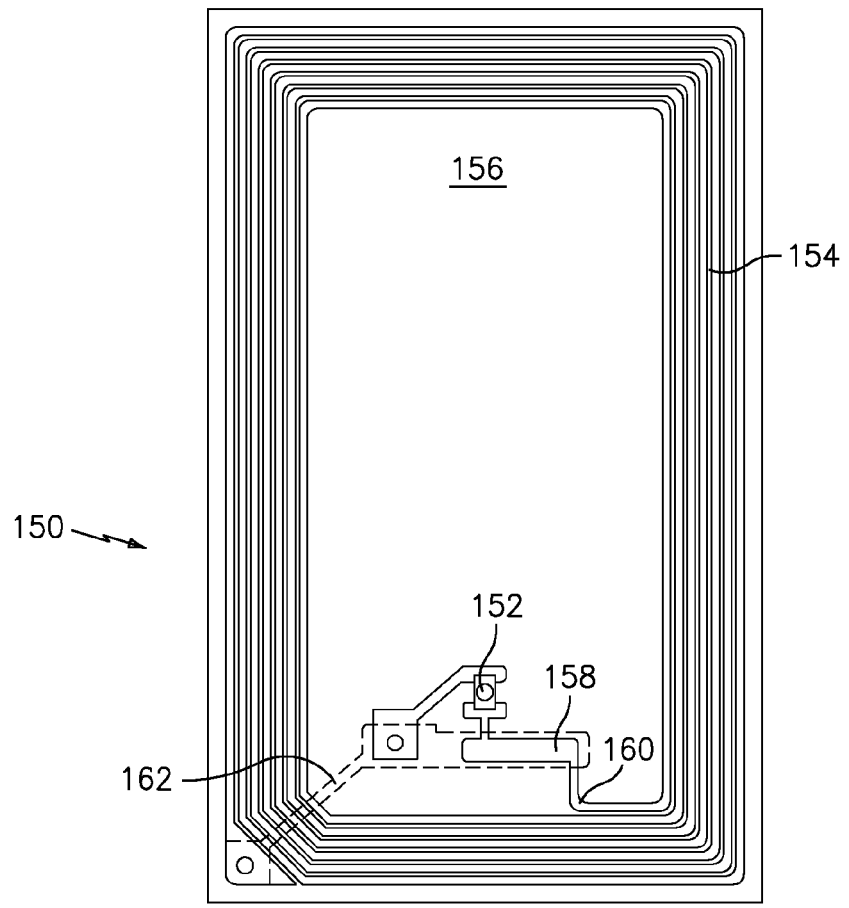

FIGS. 2 and 3 show representative RFID labels. FIG. 2 shows square label 50 with computer or memory chip 52 surrounded by circumferential antenna 54 on substrate 56, as a plastic film. The chip is connected to capacitor 58 and to antenna 54 via first antenna connection 60 and second antenna connection 62. FIG. 3 is similar to FIG. 2, with a rectangular, elongated RFID label 150 having computer or memory chip 152 surrounded by an enlarged circumferential antenna 154 on an enlarged substrate 156. Chip 150 is connected to capacitor 158 and to antenna 154 via first and second antenna connections 160, 162, similar to FIG. 2.

Figure 4:
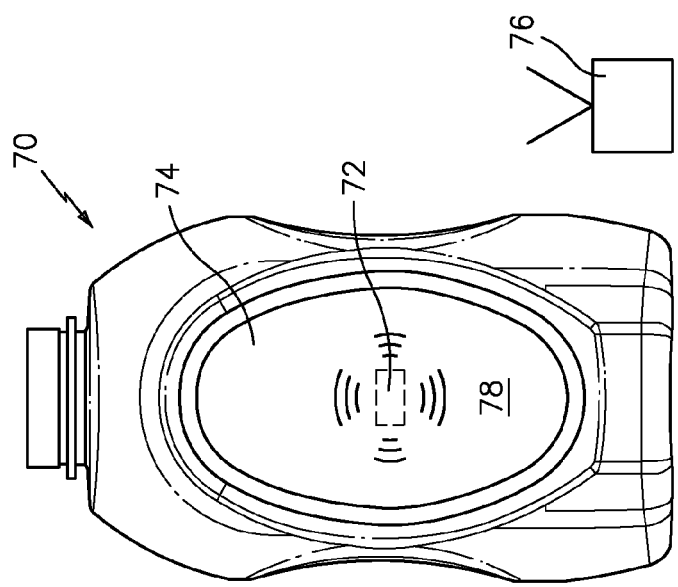
FIG. 4 shows a hollow plastic article with identification label connected thereto and an adjacent reader.

FIG. 4 shows an alternate hollow plastic article 70 which is a blow molded container having an RFID label 72 on container sidewall 74 so that a product label can cover same. Reader 76 is disposed adjacent container 70 so that the electrical signals or pulses generated by the RFID label can be read by the reader 76. Product label 78 covers RFID label 72.

Figure 6:
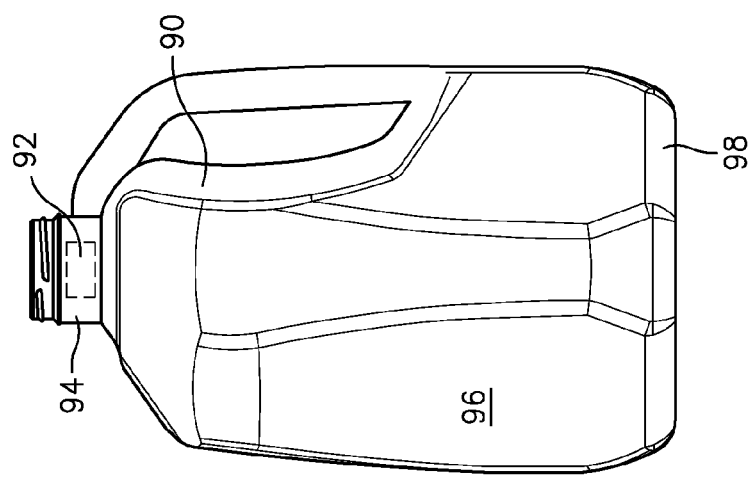
FIGS. 5-6 show alternate embodiments of hollow plastic articles with identification labels connected thereto.
Figure 5:
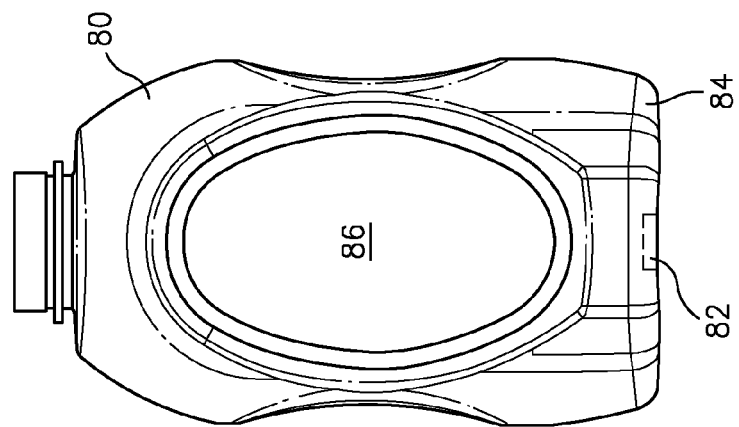

FIGS. 5-6 show alternate embodiments of blow molded containers with RFID labels integrally connected thereto. FIG. 5 shows container 80, similar in configuration to container 70 of FIG. 4; however, RFID label 82 is integrally connected to base portion 84 of container 80 rather than to sidewall portion 86. FIG. 6 shows container 90, which is also a blow molded container; however, RFID label 92 is integrally connected to neck portion 94 rather than sidewall portion 96 or base portion 98.

The RFID system can be integrally applied to a desired article as described above, as a plastic container, pallet, or other desired articles, to create a highly advantageous assembly.

Thus, for example, the above article-chip-antenna assembly can be used for inventory control, to automatically bill customers when they leave the store, for product temperature control, to alter product label designations, to track container returns, to alert one to product expiration dates, and many other uses. Moreover, this can be accomplished simply and expeditiously with a maximum of convenience for the store and customer.

Advantageously, the RFID label or transponder does not require direct contact or line of sight with the reader. The transponder simply is a device that generates electrical signals or pulses that are interpreted by the reader. The reader is a transmitter-receiver combination (transceiver) that activates and reads the identification signals from the transponder.

A part of the reader is preferably a microprocessor with functions that include decoding, performing simple calculations and forwarding the information to a computer system for record keeping and processing. The RFID label or tag is preferably an integrated circuit that is coupled to a small antenna to transmit data. The circuit contains a memory chip or computer chip that stores the pertinent data to be transmitted when the chip is activated. The reader can be either hand held or a stationary unit.

The tagging system may be classified by RF frequency bands, with high, intermediate and low frequency ranges. A low frequency transponder generates a strong and broad signal spread, and this would be preferred for the present application. It requires a shorter distance to communicate with the reader, typically no more than 10 feet and moving at a speed less than 20 miles an hour.

The medium range would not be as popular for tagging. This range is widely used by citizen band radios, automatic door openers and remote control toys, thus possibly interfering with other applications. However, many tagging applications, such as inventory control or asset tracking may rely on this range because of its versatility and strength.

High frequency systems are particularly suitable, for example, in the automobile and trucking industries. These systems often can communicate with readers at a distance greater than 250 feet while moving at speeds of more than 150 miles per hour.

RFID systems may also be categorized by their tag characteristics being active or passive.

Active tags include a power source, such as a battery. Advantages are a longer read range and a reduced power requirement. Disadvantages include limited operating life, inability to be used in all environments and a cost exceeding that of passive tags. Thus, for example, one can employ integral power means, as power paper systems where the chip and antenna system is similar to FIGS. 2 and 3, but are printed on thin film lithium, zinc manganese dioxide, or a zinc carbon system, on a substrate. The substrate could be a variety of things, as paper, polyester, fabric, etc. The chip and antenna would be applied to or printed on this powered substrate. One could also use a small battery which could be attached to an RFID label, but his would be bulkier than a film power source.

Passive tags have no integrated power source, but do have a chip and antenna, and these would be preferred for the present application. Thus, they are powered electromagnetically by the reader. Advantages are lower cost, a considerably smaller and lighter size, and a virtually unlimited life. However, they have a short read range of up to one meter and a higher powered reader is required to activate them.

The integral RFID labels of the present invention can be used to respond to conditions outside programmed parameters. For example, an RFID label of the present invention on a food item package can be set like a thermostat to signal when the temperature exceeds the point where thawing or spoiling begins. Also, the RFID labels in accordance with the present invention can be used where a bar code doesn't work, can withstand intense heat and cold, and can even withstand chemical exposure.

In addition to the significant advantages referred to hereinabove, the RFID labels of the present invention can be read through up to two inches of non-metallic debris, including paint, plastic, cloth, wood, smoke, grime and concrete. Moreover, line of sight is not required as with a bar code.

Thus, for example, using the RFID labels of the present invention a shopper can push a full cart of bagged or unbagged groceries past a reader and have a receipt therefore printed within seconds. A debit or credit card can be scanned and the shopper can quickly leave the store with purchased goods. At the same time, inventory data at the store can be updated and other management information collected. A rapid and efficient shopping system is thereby provided in a safe and effective manner.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope.

What is claimed is:

1. A method for making a container including a radio frequency identification label, the method comprising:
   placing a radio frequency identification label comprising a substrate, an antenna, and memory for the storage of data into a mold;
   positioning the radio frequency identification label so that one or more of the substrate, the antenna, and the memory abuts the mold surface; and
   molding a container such that the radio frequency identification label is integral with a side wall of the container and one or more of the substrate, the antenna, and the memory is flush with the outer surface of the side wall of the container.

2. The method of claim 1, including covering a portion of the outside surface of the container with a product label that at least partially covers the radio frequency identification label.

3. The method of claim 1, wherein the molding comprises injection molding or blow molding.

4. The method of claim 1, wherein the molded container includes a neck portion configured to receive a closure and a base portion.

5. The method of claim 1, wherein the radio frequency identification label is delivered to the mold and held in a desired location using a magnet.

6. The method of claim 1, wherein the radio frequency identification label is delivered to the mold with an air delivery means.

7. The method of claim 6, wherein the radio frequency identification label is held in a desired location using a magnet.

8. The method of claim 6, wherein the radio frequency identification label is held in a desired location using a vacuum.

9. The method of claim 1, wherein the radio frequency identification label is fed into the mold using a web that is indexed to the mold.

10. The method of claim 1, wherein the molding includes providing a preform or parison and blow molding the preform or parison to form the container.

11. A plastic bottle comprising:
   a base wall portion, a wall portion having an outside surface and extending upwardly from the base wall portion, a neck wall portion extending upwardly from the wall portion, and an opening above the neck wall portion;
   a radio frequency identification chip integrally connected to the wall portion and configured to generate electrical signals or pulses that are readable by a reader, the radio frequency identification chip comprising a substrate, an antenna, and a memory for storage of data, one or more of the substrate, the antenna, and the memory configured to be flush with the outside surface of the wall portion; and
   a product label affixed to a portion of the outside surface of the bottle, wherein the label at least partially covers the radio frequency identification chip.

12. The bottle of claim 11, including contact means connecting the antenna to the memory.

13. The bottle of claim 11, wherein the substrate comprises a plastic film.

14. The bottle of claim 11, wherein the radio frequency identification chip at least in part includes a conductive material.

15. The bottle of claim 11, wherein the identification chip includes integral power means.

16. The bottle of claim 11, wherein the product label includes graphics configured to be altered by activation of the chip.

17. The bottle of claim 16, wherein the graphics are activated by the chip when a product is approaching its expiration time or has exceeded temperature limits.

18. The bottle of claim 16, wherein the graphics are activated for a special sales promotion or for a price change.

19. A plastic bottle comprising:
   a base wall portion, a wall portion having an outside surface and extending upwardly from the base wall portion, a neck wall portion extending upwardly from the wall portion, and an opening above the neck wall portion;
   a radio frequency identification chip integrally connected to said wall portion and configured to generate electrical signals or pulses that are readable by a reader, the radio frequency identification chip comprising a substrate, an antenna, and memory for storage of data, one or more of the substrate, the antenna, and the memory configured to be flush with the outside surface of the wall portion; and
   a product label affixed to a portion of the outside surface of the bottle, wherein the label at least partially covers the radio frequency identification chip;

wherein the product label includes graphics configured to be altered by activation of the chip.

20. A method for making a container including a radio frequency identification label, the method comprising:
placing a radio frequency identification label comprising a substrate, an antenna, and memory for the storage of data into a mold;
positioning the radio frequency identification label so that one or more of the substrate, the antenna, and the memory abuts the mold surface;
injection molding or blow molding a container including a neck portion configured to receive a closure, a side wall, and a base portion, wherein the radio frequency identification label is integral with the side wall of the container and one or more of the substrate, the antenna, and the memory is flush with the outer surface of the side wall of the container; and
covering a portion of the outside surface of the container with a product label that at least partially covers the radio frequency identification label;
wherein the radio frequency identification label is delivered to the mold and held in a desired location.

* * * * *